July 1, 1952     F. A. FIRESTONE     2,601,779
MEANS FOR GENERATING SUPERSONIC WAVES
Filed May 10, 1946
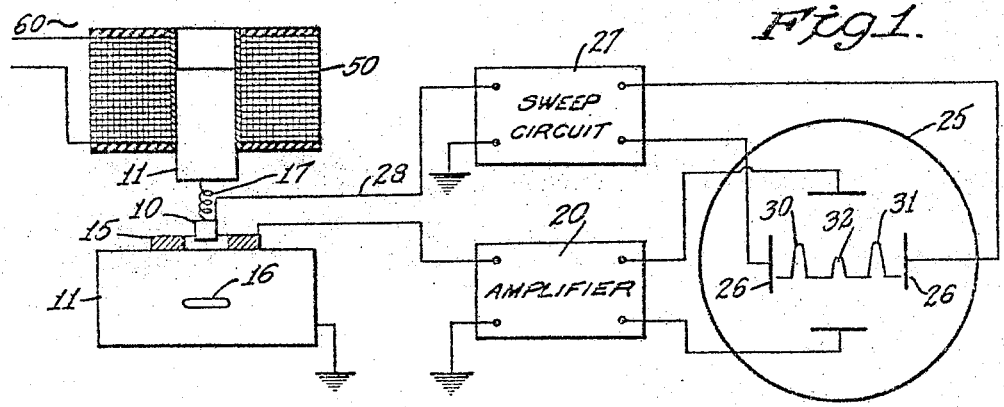
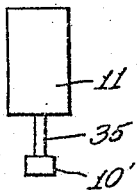
Fig.2.
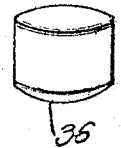
Fig.3.
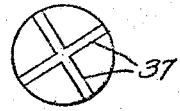
Fig.4.
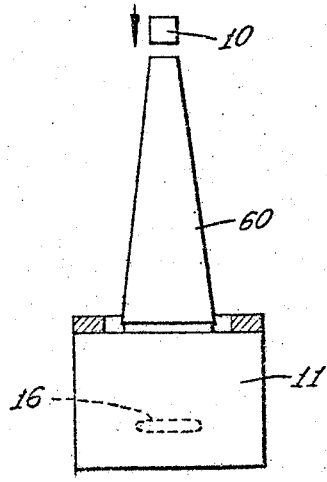
Fig.5.
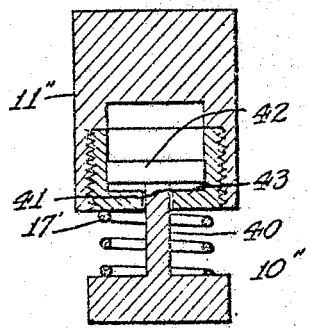
Fig.6.
INVENTOR
FLOYD A. FIRESTONE
BY Joseph H. Lipschutz
ATTORNEY Patented July 1, 1952

2,601,779

UNITED STATES PATENT OFFICE 2,601,779

MEANS FOR GENERATING SUPERSONIC WAVES

Floyd A. Firestone, Washington, D. C., assignor to Sperry Products, Inc., Hoboken, N. J., a corporation of New York Application May 10, 1946, Serial No. 668,974

4 Claims. (Cl. 73—67)

This invention relates to means for generating supersonic waves in solid objects. Heretofore, such waves were generated by impressing electric oscillations on a piezo-electric element, such as a quartz crystal, which then transmitted its vibrations into the solid. It is one of the principal objects of this invention to provide another means for generating such supersonic waves in an object. This means comprises striking the object with a hammer of suitable dimensions relative to the dimensions of the piece being struck and with predetermined velocity.

It is a further object of this invention to provide a means for generating supersonic wave trains or pulses by means of a hammer.

It is a further object of this invention to provide means whereby longitudinal waves will be substantially plane upon contact with an object under test.

It is another object of this invention to provide means for indicating the reflection of supersonic wave trains generated in an object by a hammer where the indicating means is an oscilloscope and the sweep of the oscilloscope is synchronized with the hammer.

Further objects and advantages of this invention will become apparent in the following detailed description thereof.

In the accompanying drawings:

Fig. 1 is an assembly consisting largely of an electric diagram and showing one form of my invention as applied to the detection of flaws in a solid object.

Fig. 2 is a modified form of hammer.

Fig. 3 is a front elevation of a type of hammer having a spherical end.

Fig. 4 is an end view of a hammer, showing air release passages.

Fig. 5 is a diagrammatic representation of a means whereby supersonic waves with a substantially plane front will contact and enter the workpiece under test.

Fig. 6 is a vertical section through a modified form of hammer for generating wave trains.

It has been heretofore known that objects could be tested for defects by striking the same with a hammer. In all such cases, however, the object was struck with a hammer of size and type and at a velocity designed to cause the object under test to vibrate as a whole under its natural frequency and any harmonics or overtones thereof. It has not heretofore been suggested that by means of a hammer supersonic waves could be generated in an object under test preferably in the form of a wave train whereby the supersonic waves would travel into the object and be reflected back from any reflecting surfaces such as the surface of the object opposite the surface through which the supersonic waves enter, or from a defect within the object. A wave train is a group of adjacent waves such that at a chosen instant there is no displacement ahead or behind (in the line of propagation) the wave group. In another form such supersonic waves could be employed by measuring the quantity of waves passing through the object. If such supersonic waves could be generated, then they could be utilized for the purpose of testing an object in the manner disclosed, for example, in my Patent No. 2,280,226, granted April 21, 1942, wherein the vibrations in the material are detected by a piezo-electric element such as a quartz crystal and after being amplified are impressed on the sweep of an oscilloscope.

I have found that it is possible to generate a supersonic wave train in an object under test if the length of the hammer in the direction of striking is sufficiently small. The frequency of vibration of a cylindrical hammer vibrating along its axis after one of its end faces has struck the work is either $$f = \frac{v}{2L} \text{ or } f = \frac{v}{4L}$$

depending in part on how firm a contact is established between the hammer and the work, where $v$ is the velocity of longitudinal sound waves in the hammer, and $L$ is the length of the cylinder. The wave length of the waves radiated into the work is $$\lambda = \frac{v}{f}$$

where $v$ is the velocity of propagation of longitudinal waves in the work. Thus, assuming that the first formula above is applicable and that the length of the hammer is ¼", and the velocity $v$ of sound in both the hammer and the work is 250,000"/sec. then it will be seen from the above formula that a frequency of 500,000 cycles/sec. will be obtained within the object under test by striking it with a hammer ¼" in length and a wave length of ½" will be produced in the work. If the lateral dimensions of the hammer are large relative to the wave length, then a longitudinal beam of supersonic wave train of frequency 500,000 will be generated within the object. Any other desired frequency may be obtained, and, in general, by the term supersonic frequency, I am referring to frequencies in excess of 100,000 cycles/sec.

One advantage of the hammer as a source of supersonic waves is its ability to produce very strong waves. In fact, if the hammer and the work are of the same material and the hammer makes square, firm contact with the work, supersonic waves may be produced in which the stresses are equal to the elastic limit of the material if the velocity of the hammer at the time of impact divided by the velocity of sound in the material is equal to the strain in the material at the elastic limit. This is apparent from the formula:

Elastic limit (stress) =
E (Young's modulus) $\frac{C \text{ (velocity of striking)}}{c \text{ (velocity of sound in the material)}}$ Thus, if c is 15,000'/sec. and E is 30,000,000#/sq. in., and hammer velocity at the time of impact of roughly 100'/sec., supersonic waves in steel would have stresses approaching the elastic limit. With waves of such strength, weak welds may actually be torn apart.

After radiating ½ wave the hammer tends to bounce out of contact with the work end, if it is desired to radiate a wave train or pulse consisting of several waves, it is necessary to provide means for holding the hammer in contact with the work during several periods of its vibration. One method of accomplishing this result is disclosed in Fig. 1 wherein a primary hammer 10 is designed to strike an object 12 under test to generate a train or pulse of supersonic waves in the object. For this purpose the primary hammer 10 is connected to a secondary hammer 11 which has a lower frequency against the stiffness of spring 17 and longer period than hammer 10. Thus, the hammer 10 will be kept in contact with the object 12 throughout a number of cycles corresponding to the half period of the longer period secondary hammer 11 on spring 17. By suitably proportioning the primary and secondary hammers and the connecting spring, a wave train of any desired duration can be generated. The wave train which is generated in the object 12 may be detected by a piezoelectric element which may take the form of a quartz crystal 15 in engagement with the object 12. The crystal will be affected by the pulse at the time of its generation and will also be affected by the reflections of said pulse from any reflecting surfaces such as the opposite surface of the object 12 or from the surfaces of a defect 16 within the object. The responses of the crystal 15 to the pulses, both original and reflected may be amplified by an amplifier 20 and caused to deflect vertically the horizontal sweep of an oscilloscope 25. The horizontal sweep of the oscilloscope may be generated between horizontal plates 26 from a sweep circuit 27 which may be synchronized with the striking of the hammer 10 against object 12 by causing the hammer to close a circuit through the sweep circuit by way of connection 29. Thus, each time the hammer 10 contacts the entering surface of object 12, the horizontal sweep is generated, and thus pulses due to the initial pulse as well as reflections will vary the sweep to give a visible indication. The output of the amplifier 20 is caused to displace the horizontal sweep vertically so that the initial pulse of the wave train entering object 12 will appear as an indication 30 while the reflection of the pulse from the rear surface of the object will appear as an indication 31 displaced horizontally from indication 30, the degree of displacement representing a predetermined time interval. This time interval represents the time necessary for the pulse to travel to the rear surface of the object 12 and return to the entering surface of crystal 15 and is a function of the thickness of object 12. If an indication 32 appears at a time interval less than that between 30 and 31 it represents a reflection from an intermediate reflecting surface such as the defect 16 which is thus detected.

The crystal 15 may be ring-shaped, as shown, with a central opening in which the hammer 10 operates, but other forms of crystal may be employed. The receiving crystal 15 may be located at some other part of the surface of object 12 than near the hammer.

In Fig. 1 the high frequency short period primary hammer 10 is shown connected to the low frequency long period secondary hammer 11 by a spring 17 which is diagrammatically illustrated. Other forms of resilient connection may be employed as shown, for instance, in Fig. 2 where the primary hammer 10' is connected to the secondary hammer 11' through a reduced portion 35, so that the entire unit may be turned out of a single piece.

Since it is desirable for the hammer to strike the object squarely and it is essential that the trapped air between the hammer and the object under test be permitted to escape quickly, the lower end of the hammer may be formed as shown in Fig. 3 with a spherical portion 36 in which grooves 37, as shown in Fig. 4, are cut to permit the trapped air to escape freely.

A modified form of hammer arrangement designed to produce a large force on the primary hammer for a considerable period is shown in Fig. 6 wherein the primary hammer 10'' is connected to the second hammer 11'' by a spring 17' which is normally under compression. For this purpose the primary hammer 10'' may be provided with a stem 40 which extends through an opening 41 in the secondary hammer, the stem 40 being provided with a flange 42 whose downward movement under the action of spring 17' is limited by the bottom 43 of secondary hammer 11''. When the secondary hammer 11'' is moved toward the workpiece the hammers 10'' and 11'' move as a unit until 10'' strikes the work but 11'' continues the downward movement. The fact that the spring is pre-compressed means that a powerful force is immediately transmitted to hammer 10'' and then into the workpiece and with such force will act for a considerable period immediately following the instant of impact, during which period the primary hammer 10'' will oscillate and radiate a wave train.

The hammer arrangement shown consisting of primary hammer, secondary hammer and resilient connection will be effective to generate a single wave train. If it is desired to generate repeated wave trains at periodic intervals, the secondary hammer may be actuated from some suitable source of periodic power which may be either magnetic, pneumatic or other means. As shown, the hammer is actuated by a polarized magnet 50 which is energized from a 60 cycle source of current so that it may strike 60 blows per second, the blows always occurring at the same portion of the current cycle. In this manner, the indications 30, 31 and, if a defect is present, also the indication 32, will be repeated so that the eye will retain the indications, resulting in a visible indication.

It has been stated hereinbefore that, in order to generate supersonic longitudinal waves, a hammer which is small in dimension relative to the object under test must be employed. If the lateral dimension of the contact area of the hammer and work is also small compared with the radiated wave length, spherical waves will emanate outwardly from the point of impact as a center. The larger the diameter of the circular wave front the more nearly a small chord of said spherical surface approaches a plane surface. In order to obtain substantially plane wave fronts when such hammer is employed, I may utilize an interposed member in the form of an anvil 60 between the hammer and the workpiece 12 so that if the anvil is moderately long the wave fronts arriving at the work will be essentially plane. The anvil may be connected to the workpiece through oil, mercury, glycerine or foil.

The foregoing description of the invention is merely illustrative and changes may be made within the scope of the appended claims.

Having described my invention, what I claim and desire to secure by Letters Patent is:

1. A device for inspecting a solid object by vibrational wave trains, which comprises a hammer whose dimension in the direction of motion is small relative to the dimension of the object in the same direction, means for actuating the hammer into striking engagement with the object, whereby wave trains will be propagated in the object as distinguished from vibrations of the object as a whole, an electro-acoustic transducer engaging the surface of the object and responsive to said wave trains, means for indicating the output of the transducer including an oscilloscope having a sweep circuit, means for controlling said sweep circuit contact between the hammer and the object, and means for deflecting the sweep by the output of the transducer.

2. A device as specified in claim 1, characterized by the fact that the longitudinal dimension of the hammer in the direction of striking is equal to $v/2f$, where $f$ is any desired supersonic frequency and $v$ is the velocity of longitudinal waves in the hammer.

3. A device as specified in claim 1, characterized by the fact that the longitudinal dimension of the hammer in the direction of striking is equal to $v/2f$, where $f$ is the desired frequency and $v$ is the velocity of longitudinal waves in the hammer; and means for maintaining the hammer in engagement with the object for a plurality of cycles comprising a second hammer resiliently connected to the first hammer, the period of the second hammer in conjunction with said resilient connection when the first hammer is contacting the object being longer than the period of the first hammer.

4. A device as specified in claim 1, characterized by the fact that the hammer consists of a unitary member having a reduced portion forming a resilient connection between upper and lower portions, said upper portion in conjunction with the resilient connection having a longer period than the lower portion, the lower portion being adapted to strike the object, the dimension of the lower portion in the line of motion being such as to cause said lower portion to vibrate at a supersonic frequency on striking the object.

FLOYD A. FIRESTONE.

REFERENCES CITED

The following references are of record in the file of this patent:

UNITED STATES PATENTS

| Number | Name | Date |
|---|---|---|
| 1,109,811 | Wood | Sept. 8, 1914 |
| 1,130,657 | Armstrong | Mar. 2, 1915 |
| 1,205,202 | Herschede | Nov. 21, 1916 |
| 2,079,612 | Hollis | May 11, 1937 |
| 2,105,479 | Hayes | Jan. 18, 1938 |
| 2,280,226 | Firestone | Apr. 21, 1942 |
| 2,307,989 | Bower | Jan. 12, 1943 |
| 2,320,390 | Shmurak | June 1, 1943 |
| 2,412,240 | Williams | Dec. 10, 1946 |

FOREIGN PATENTS

| Number | Country | Date |
|---|---|---|
| 59,996 | Norway | Oct. 24, 1938 |